United States Patent [19]

Damon

[11] 4,192,274
[45] Mar. 11, 1980

[54] DIESEL FUELED ENGINE COOLANT HEATER

[76] Inventor: Ralph S. Damon, 3892 W. 36th St., Cleveland, Ohio 44109

[21] Appl. No.: 884,633

[22] Filed: Mar. 8, 1978

Related U.S. Application Data

[62] Division of Ser. No. 584,948, Jun. 9, 1975, Pat. No. 4,099,488.

[51] Int. Cl.² ............................................. F02N 17/02
[52] U.S. Cl. ............................................. 123/142.5 R
[58] Field of Search .................. 123/142.5 R; 122/33, 122/136 R, 156, 250; 431/9, 183, 185

[56] References Cited

U.S. PATENT DOCUMENTS

| | | | |
|---|---|---|---|
| 1,980,424 | 11/1934 | Morgan | 122/156 |
| 2,022,512 | 11/1935 | Macchi | 431/9 |
| 2,160,644 | 5/1939 | Clarkson | 122/250 R |
| 2,623,511 | 12/1952 | Welin Berger | 123/142.5 R |
| 2,717,580 | 9/1955 | Maher et al. | 122/33 |
| 2,815,069 | 12/1957 | Garraway | 431/185 |
| 3,131,864 | 5/1964 | Young | 123/142.5 R |
| 3,226,038 | 12/1965 | Brady et al. | 431/183 |
| 3,236,220 | 2/1966 | Holmes | 123/142.5 R |
| 3,304,004 | 2/1967 | Hraboweckyj | 123/142.5 R |
| 3,400,700 | 9/1968 | Lindsey et al. | 123/142.5 R |
| 3,758,031 | 9/1973 | Moran | 123/142.5 R |

*Primary Examiner*—Ira S. Lazarus
*Attorney, Agent, or Firm*—Fay & Sharpe

[57] ABSTRACT

A diesel fueled engine coolant heater for vehicles powered by a liquid cooled diesel engine. The heater is adapted to burn diesel fuel ordinarily carried by the vehicle. All electrical components of the system are powered by the vehicle electrical system. The heater supplies a source of thermal energy for engine coolant fluid in order to provide for rapid starting of the vehicle engine in cold temperatures and, if needed, to provide heat for the passenger compartment of the vehicle while the vehicle engine is stopped.

7 Claims, 13 Drawing Figures

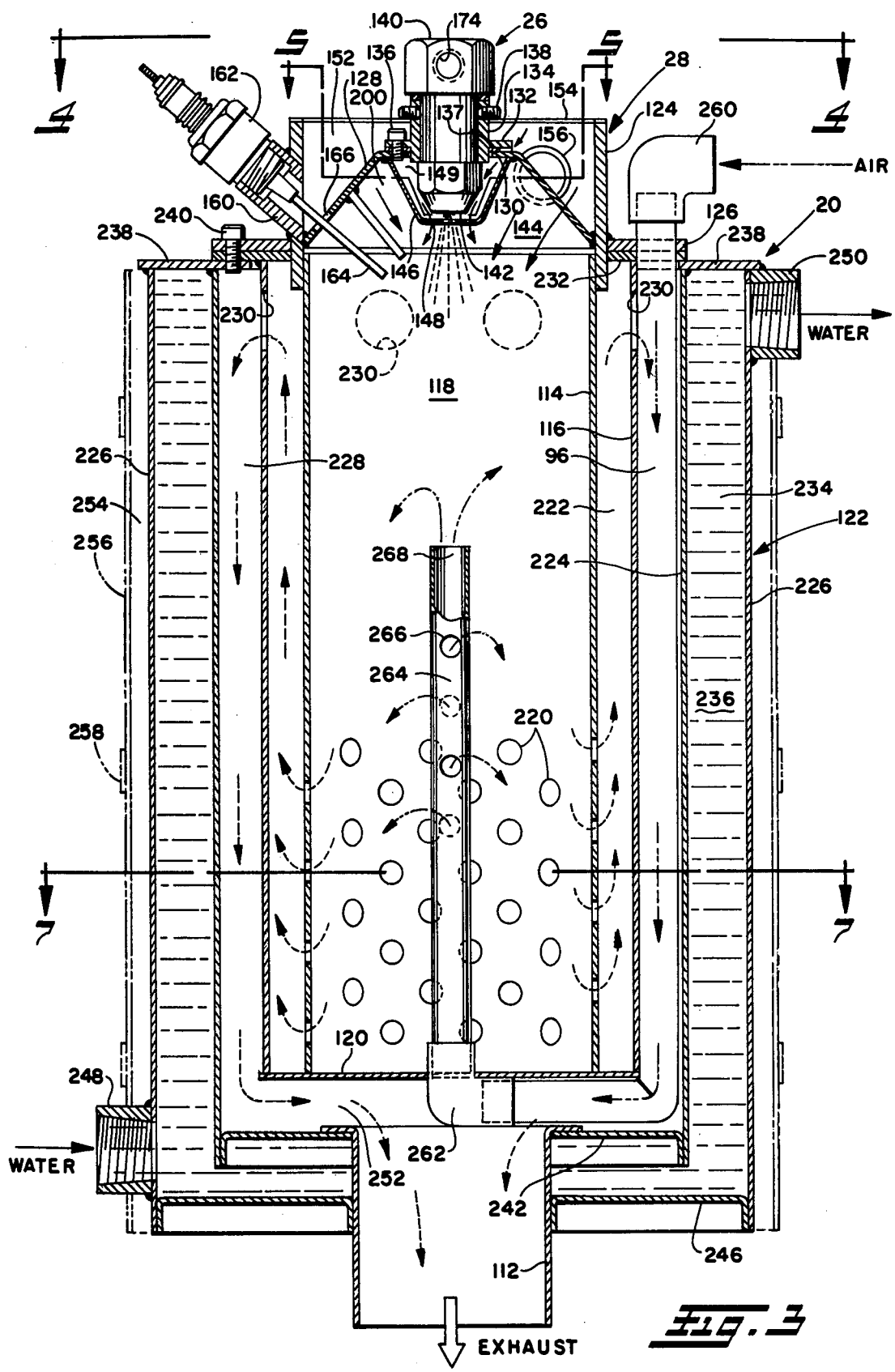

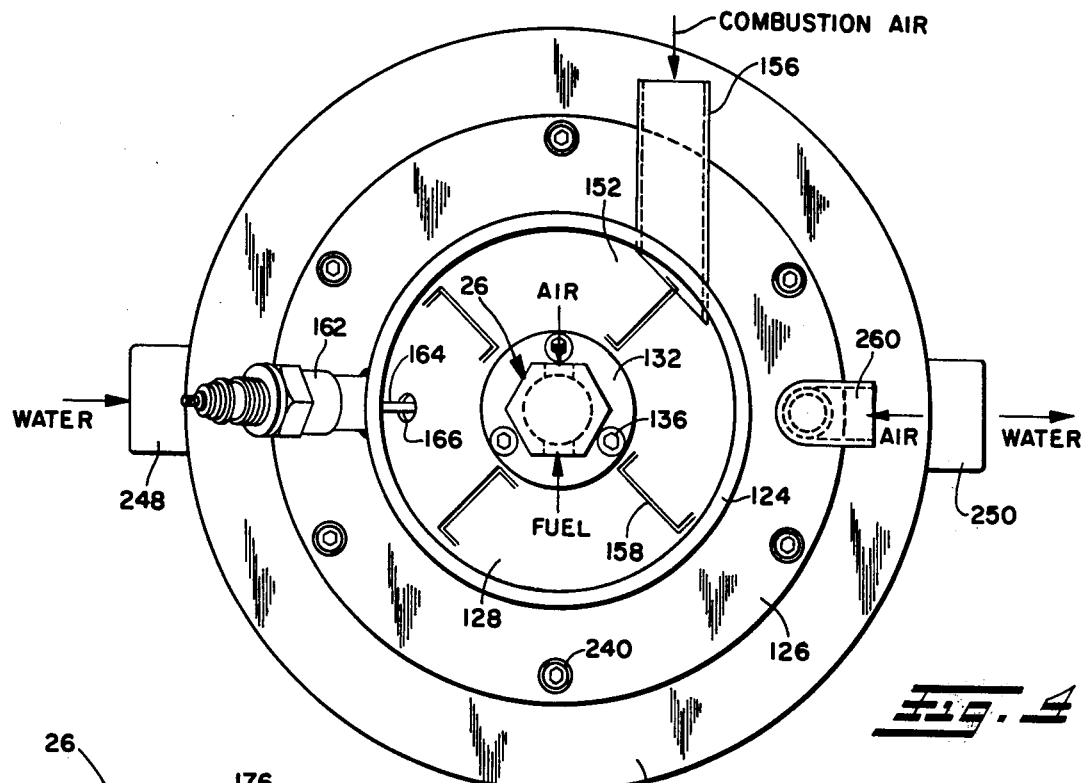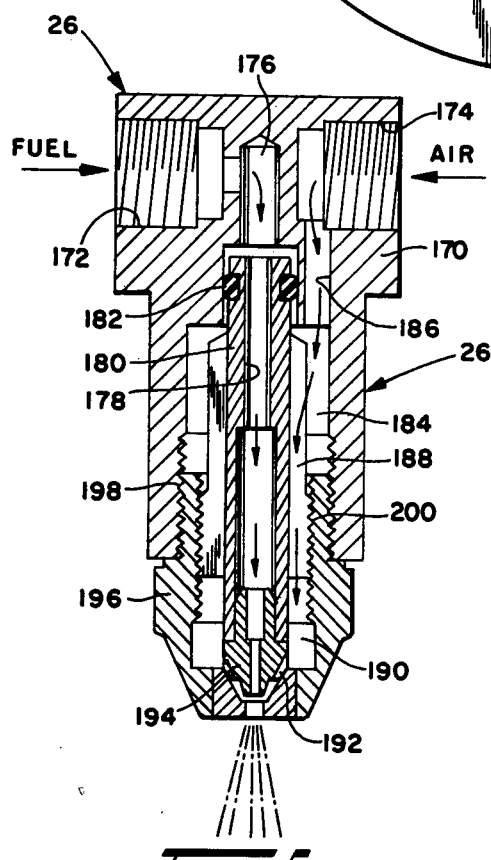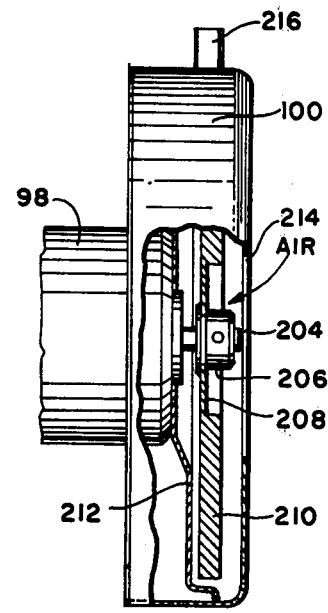

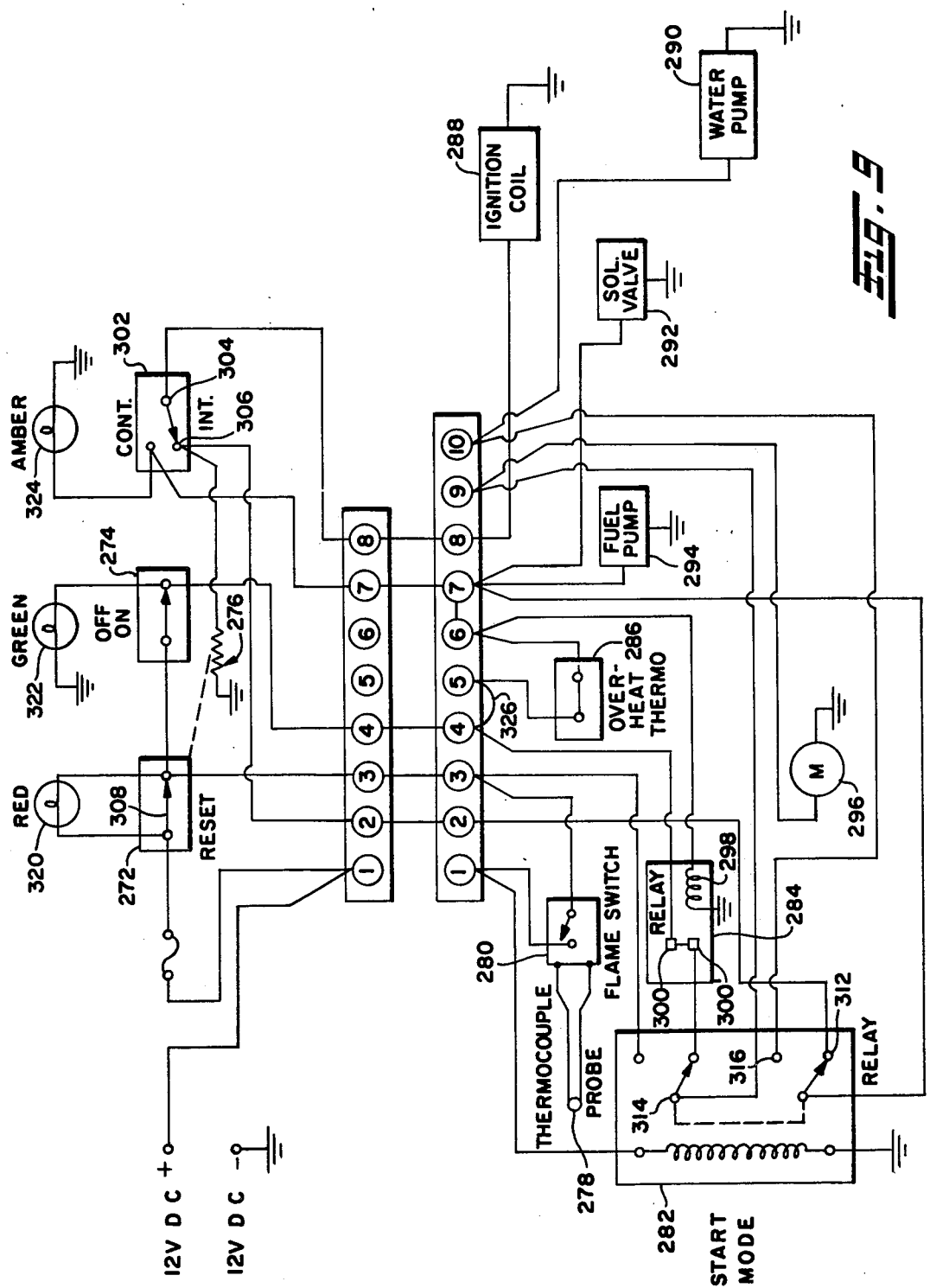

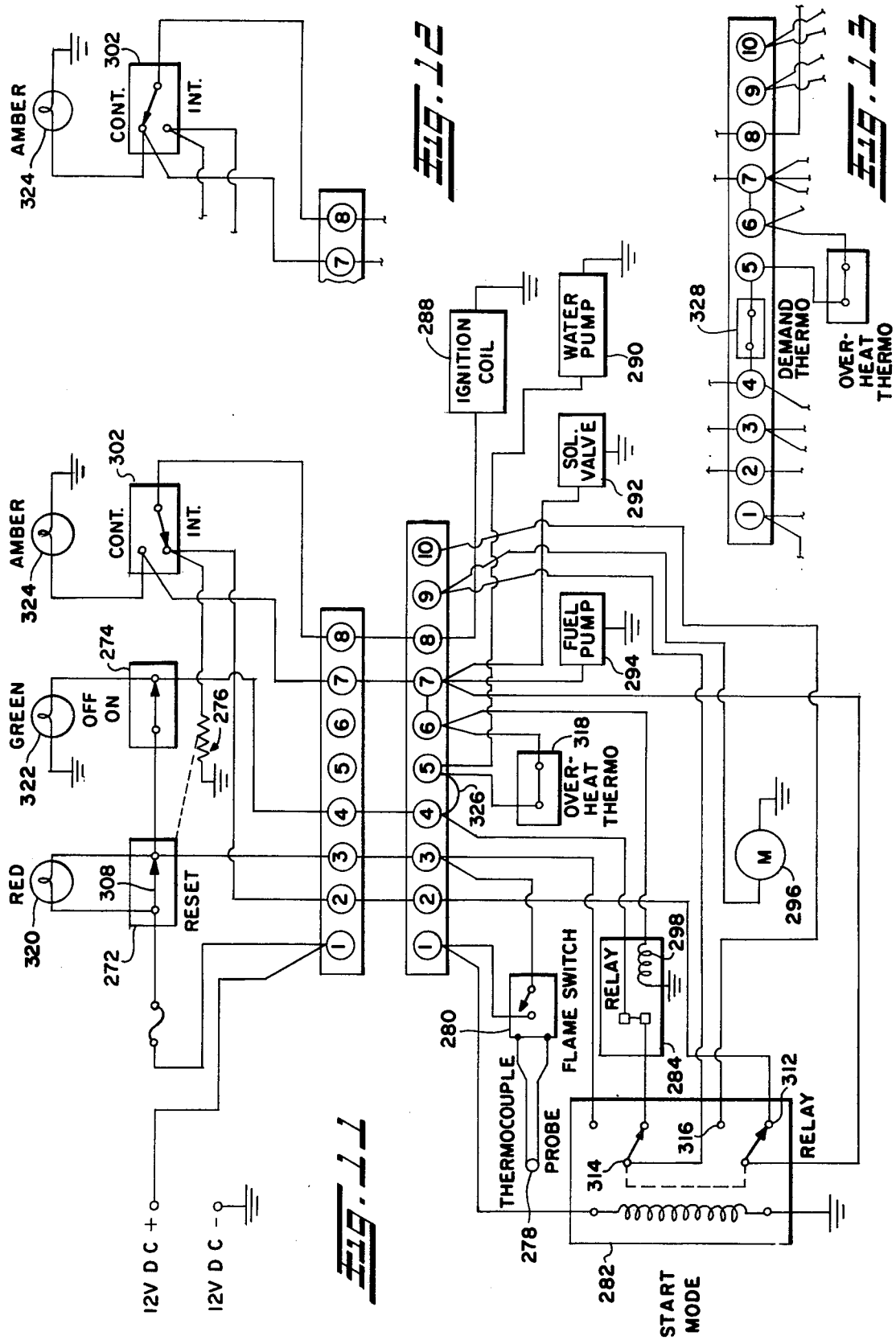

DIESEL FUELED ENGINE COOLANT HEATER

This is a division of application Ser. No. 584,948, filed June 9, 1975, now U.S. Pat. No. 4,099,488.

BACKGROUND OF THE INVENTION

This invention relates to a diesel fueled coolant heater for vehicles powered by liquid cooled diesel burning engines.

When diesel powered vehicles such as construction equipment, truck tractors and the like are operated in cold climates, consideration must be given to the manner of starting a cold engine. Typically, when temperatures fall below freezing various means must be used in order to achieve a successful start and warm up of a diesel engine. As a consequence it is not uncommon for truck drivers and other vehicle operators to leave the vehicle engine running continuously during non-operating periods in order to avoid a cooling down of the engine and its associated coolant fluid, engine oil, etc. It is not uncommon, for example, to see trucks parked in cold climates with their engines running at idle speed in order to maintain engine heat while the driver is eating, sleeping or attending to other duties; or for construction equipment engines to be left running overnight.

In those instances where the driver of the vehicle utilizes the vehicle cab or driver compartment for sleeping purposes it is necessary to maintain the engine in a running condition during the period of sleep in order to provide heat for the driver.

It is well known that running a diesel engine for long periods of time at idle speed can be harmful to the components of the engine. Further, in view of increased fuel costs due to the present energy crisis there are severe cost disadvantages in running a vehicle engine at idle speed simply for the purpose of providing heat for the driver or for the purpose of avoiding engine cool down with the consequence that starting may be difficult.

Accordingly, this invention is directed to an engine coolant heater separately fired from the engine itself. The purpose of the heater is to provide auxiliary thermal energy for engine coolant to achieve two purposes, i.e., to maintain the engine block at a predetermined temperature during the time that the engine is shut off and to provide a source of thermal energy for the passenger compartment of the vehicle.

Auxiliary heaters for purposes of providing thermal energy for engine coolant fluids and to provide heating for the passenger compartment of a vehicle have been known for some time. There have been several drawbacks, however, with specific structures offered in the prior art.

Many of the auxiliary heaters previously offered to the trade burned gasoline, propane, or other fuel not compatible with a diesel engine. Consequently, the installation of such a heater in a diesel powered vehicle necessitated the addition of a separate fuel tank for the gasoline, propane, etc. Such additional fuel tank is not ordinarily provided by the manufacturer of the vehicle and, therefore, its installation as an additional tank may, in some cases, constitute a safety hazard. A further disadvantage in the installation of a separate fuel tank is the fact that a second fuel must be available at work sites or refueling stations. Accordingly, it may not be possible to provide for a fill up of the auxiliary heater tank at the same location as that providing diesel fuel.

SUMMARY OF THE INVENTION

Briefly summarized, this invention is directed to a diesel fueled engine coolant heater and a control system for such heater for use in diesel engine powered vehicles.

The heater itself, which is adapted to burn diesel fuel from the vehicle fuel tank, is provided with a fuel-primary air injection nozzle supported by a burner head. Means are provided at the heater for the introduction of seconardy and tertiary air into the combustion chamber. The fuel-air mixture in the combustion chamber is ignited by a spark igniter which receives a source of electrical energy from the vehicle electrical system. In fact, all of the accessories of the engine coolant heater system of this invention are operated by energy supplied by the vehicle electrical system. There is, thus, no necessity to provide for any additional source of electrical energy in the vehicle other than that ordinarily provided by the vehicle electrical system.

Once fuel and air is combusted in the heater combustion chamber, coolant fluid is caused to pass in heat exchange relationship to the products of combustion. Heated coolant fluid is then caused to be pumped to the engine block for purposes of maintaining a predetermined temperature level in the engine block thus to render less difficult the starting of the engine. An alternate loop of cooling fluid is provided for purposes of supplying thermal energy to the heater core of the vehicle passenger compartment in the event that it is desired to provide heat in the passenger compartment with the vehicle engine shut down.

A control system for the coolant heater is provided which includes switching means, circuit interrupting means, and a two-position relay having a start mode and a run mode. In the start mode the control system provides for electrical energy to be supplied to the ignition apparatus, a compressor and blower, a fuel pump, and a fuel shut-off solenoid valve. An electrical timer means is also energized by the relay in the start mode. After starting, the electrical timer means functions to trip circuit interrupting means after a predetermined timed interval if ignition in the combustion chamber has not been proven. Once ignition is achieved a flame switch closes thereby acting to switch the relay from the start mode to the run mode. The electrical timer means is thereby deactivated. A high temperature limit thermostat is disposed in the coolant loop and is adapted to interrupt the electrical circuit to the fuel pump and the solenoid shutoff valve once a desired operating temperature in the engine coolant is reached.

BRIEF DESCRIPTION OF THE DRAWINGS

For a more complete description of the preferred embodiment of this invention, reference will now be made to the accompanying drawings in which:

FIG. 3 is a cross-sectional elevational view of the engine coolant heater of this invention;

FIG. 4 is an elevational view taken along the line 4—4 of FIG. 3 and with the burner head safety cover removed in order to show the interior of the burner head;

FIG. 6 is a cross-sectional elevational view of the fuel-primary air nozzle of the burner head of this invention;

FIG. 8 is an elevational view, partly in section, and showing a portion of the compressor-blower of the apparatus of this invention;

FIG. 9 is an electrical schematic diagram of the control system of this invention in the "start" mode;

FIG. 11 is an electrical schematic diagram similar to that shown in FIG. 9 of a modified control system in which the water pump is attached to terminal "5";

FIG. 12 is a partial electrical schematic view of a modification of the control system of this invention in which the spark igniter selection switch has been moved from the "intermittent" position to the "continuous" position; and FIG. 13 is a partial electrical schematic view of a modification of the control system of this invention in which a demand thermostat is inserted between terminals "4" and "5".

DESCRIPTION OF THE PREFERRED EMBODIMENT

Figure 1:
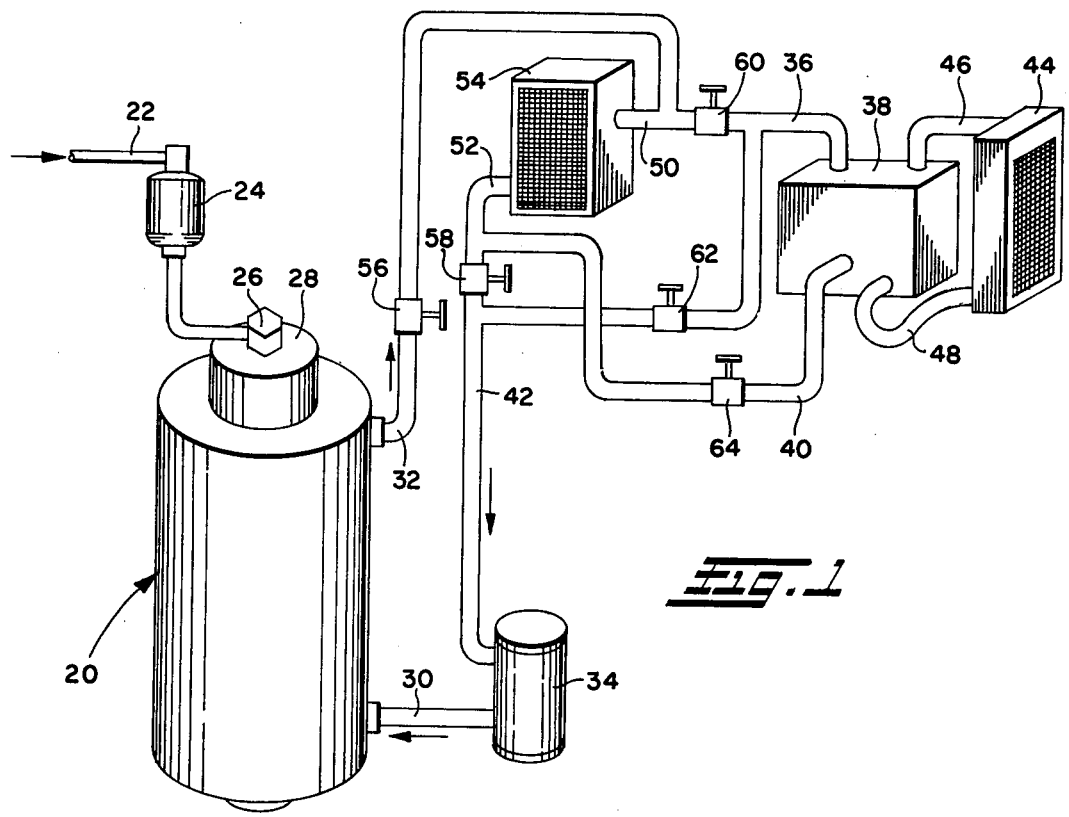
FIG. 1 is a schematic representation of the coolant heater, engine block, and heater core for the passenger compartment of a vehicle and showing the interconnecting coolant loops for these members.

Attention will first be directed to FIG. 1 wherein there is shown schematically a diagrammetric arrangement of the principal elements of the coolant heater system of this invention.

The coolant heater itself is designated 20 and is adapted to receive diesel fuel from the vehicle fuel tank by means of conduit 22. A fuel pump 24 is supplied in order to provide for a flow of diesel fuel to the nozzle 26 of the burner head 28 of the coolant heater. Not shown in the schematic representation of FIG. 1 is the apparatus for supplying primary, secondary and tertiary air to the coolant heater. It should be understood, however, that air and diesel fuel are supplied to the coolant heater for the purpose of supporting combustion within the coolant heater in order to provide thermal energy for liquid coolant which is caused to be passed through the heater. Such coolant, which is typically either water or a mixture of water and antifreeze, is caused to enter the coolant heater through conduit 30 where it is heated within the heater and caused to be discharged through conduit 32. A coolant pump 34 is provided in the coolant loop in order to provide for a flow of coolant throughout the entire system.

The flow of coolant fluid from the heater proceeds from conduit 32 into conduit 36 where it then enters the engine block 38. A return flow of fluid from the engine block to the heater is accomplished through conduit 40 and conduit 42 where the cycle is repeated after passing through the coolant pump 34.

As is shown schematically in FIG. 1, the engine is provided with a radiator 44 and conduits 46, 48 in order to provide for the flow of coolant fluid into and out of the engine block at such time as the engine is in an operating condition and the radiator 44 is functioning to provide for cooling of the fluid. Typically, however, since this invention relates to a heater normally employed when the engine is not in an operating condition, the radiator 44 and the conduits 46, 48 are not in use at the time the apparatus of this invention is employed.

The coolant loop defined by the conduits 32, 36, 40 and 42 may be regarded as the primary coolant loop providing for the flow of heated fluid from the heater 20 into the engine block 38 for the purpose of maintaining engine block 38 at a predetermined temperature. Thus, the heated coolant fluid serves to impart thermal energy to the engine block and to the various engine accessories at the engine block including engine oil, valve lifters, etc.

There is also shown in FIG. 1 a secondary coolant loop which includes the conduits 50, 52. This secondary loop provides for a flow of heated coolant fluid through the heater core 54 which, typically, is placed in the passenger compartment of the vehicle for the purpose of providing heat for one or more passengers in the vehicle.

A plurality of valves 56, 58, 60, 62 and 64 are provided in the coolant loops in order to define the desired flow from the heater 20 to one or both of the engine block 38 and the heater core 54.

If it is desired to heat both the cab of the vehicle and the engine block, valves 58 and 60 are closed and valves 56, 62 and 64 are opened. If it is desired to heat only the cab, valves 60, 62 and 64 are closed and valves 56, 58 are opened. Thus, in this condition, the engine block is bypassed and thermal energy imparted to the coolant fluid is provided only at the heater core 54.

When the vehicle is normally operating with the engine running and the coolant heater 20 is not in operation the valves 56, 58 and 62 are closed while the valves 60, 64 are opened. In this condition the engine block and heater core are interconnected in a simple loop to provide for transmission of heat from the engine to the heater core as called for in the vehicle cab by the operator.

Figure 2:
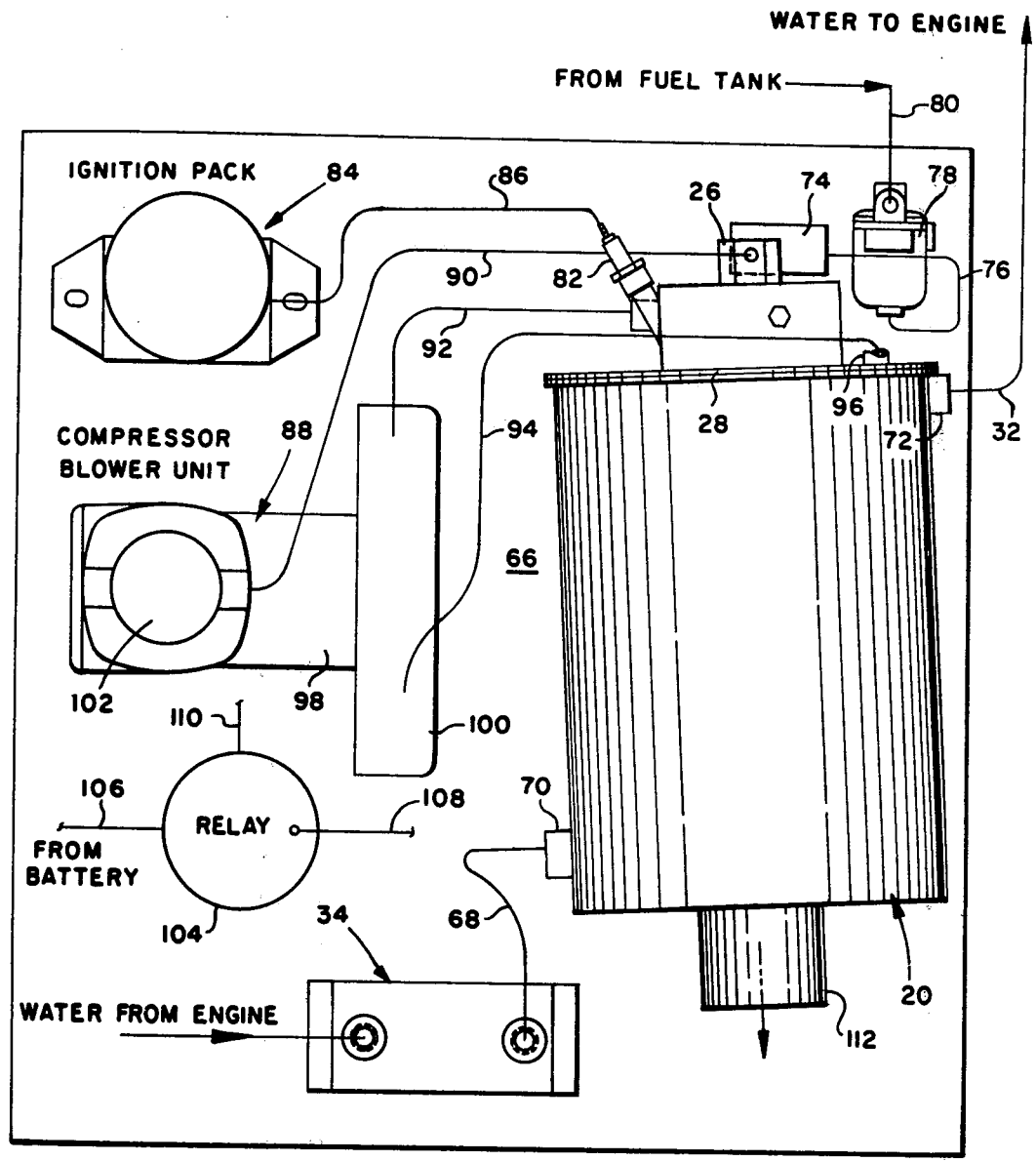
FIG. 2 is a schematic representation of several elements of the engine coolant heater system of this invention as mounted on a panel suitable for installation in a vehicle.

The schematic diagram of FIG. 1 is intended to generally describe the relationship of the coolant heater of this invention to the engine block and heater core of the vehicle. Reference will now be made to FIG. 2 in which there is shown schematically the arrangement of several of the components of the engine coolant heater system of this invention as mounted on a panel 66. The panel is adapted to be installed in a vehicle at any desired location. It is preferred, however, to install applicant's coolant heater system in the engine compartment of the vehicle. It should be understood, however, that within the spirit of this invention the several elements of the coolant heater system may be installed at any convenient location either on or in a vehicle.

The elements as shown in FIG. 2 include the coolant heater 20 and the coolant pump 34. These reference characters for the coolant heater and the coolant pump have been previously used in connection with the description of FIG. 1 and they will be carried throughout the description of the invention to refer to these specific elements.

Coolant fluid or water from the engine block is shown schematically in FIG. 2 as entering the coolant pump 34 at the left hand side thereof. Hose or conduit 68, shown schematically in FIG. 2, causes the fluid to pass into the inlet 70 of the coolant heater where it is caused to pass in heat exchange relationship to the products of combustion generated within the heater as will be described more fully hereafter. Coolant fluid is then caused to pass out of the outlet 72 of the heater where it is, in turn, caused to be conducted to the engine block and/or the heater core in the manner shown schematically in FIG. 1. In order to better equate FIGS. 1 and 2 it may be assumed that the conduit 32 shown schematically in FIG. 2, is the same conduit 32 shown in FIG. 1 which provides for a flow of coolant fluid into the valve 56.

Continuing with a discussion of FIG. 2, the coolant heater 20 is provided with a burner head 28 and a fuel-primary air injection nozzle 26. A more complete description of the nozzle 26 will be made in connection with a description of FIGS. 3 and 6 which will follow.

Mounted closely adjacent the nozzle 26 is a solenoid operated shutoff valve 74 which serves to control the flow of diesel fuel into the coolant heater. The solenoid operated shutoff valve 74 forms no part of this invention and, therefore, a further description of the specific operating elements of the valve is believed to be unnecessary. However, it should be noted that the valve is normally in an off or closed position and that when activated by the electrical system of the vehicle, it is opened and causes fuel to flow into the burner head of the coolant heater in a manner to be described more fully hereafter.

The fuel interconnection to the solenoid operated shut-off valve 74 is shown schematically in FIG. 2 as a conduit 76 which extends from the fuel bowl 78. A supply of diesel fuel to the bowl 78 is provided by means of conduit 80 shown schematically in FIG. 2 which makes fluid communication with the vehicle fuel tank. It should be understood, however, that a fuel pump, adapted to be operated by the electrical system of the vehicle, is disposed in the conduit 80 for the purpose of supplying diesel fuel under pressure from the vehicle fuel tank to the bowl 78. The fuel pump has not been shown in FIG. 2 for ease of description. It is shown schematically, however, as element 24 in FIG. 1. Again for ease of description the fuel bowl 78 has been omitted from FIG. 1. However, it should be understood that both a fuel pump and a fuel bowl are provided in order to accomplish a flow of fuel from the vehicle fuel tank to the electrical shutoff valve of the coolant heater.

A spark plug or igniter means 82 is shown schematically in FIG. 2. An ignition pack or ignition apparatus 84 is provided for the purpose of supplying high voltage electrical energy to spark plug 82. A high tension wire 86 provides an electrical interconnection between ignition apparatus 84 and the spark plug. Since the ignition apparatus forms no part of this invention a further description of the operation of the apparatus is believed to be unnecessary. However, it should be understood in a general sense that the function of the ignition apparatus 84 is to convert low voltage electrical energy from the electrical system of the vehicle to high voltage energy to be transmitted to the spark plug for the purpose of igniting a combustible mixture within the coolant heater in a manner to be described more fully hereafter.

Although not shown in FIG. 2, it should be noted that an electrical wire is provided for the purpose of supplying low voltage electrical energy to the ignition apparatus 84 from the vehicle electrical system. For ease of explanation all electrical wiring has been omitted from the schematic of FIG. 2. The relationship of the ignition apparatus in the overall control system for the coolant heater will be described below.

Mounted immediately below the ignition apparatus 84 is the compressor-blower unit 88. This unit receives electrical energy from the low voltage electrical system of the vehicle and, in turn, supplies primary, secondary and tertiary air to the combustion heater.

Primary air is conducted to the nozzle 26 of the coolant heater 20 by means of conduit 90 shown schematically in FIG. 2. Secondary air is conducted to the burner head 28 by means of conduit 92. Finally, tertiary air is supplied to the air pipe 96 by means of conduit 94. The function of the primary, secondary and tertiary air as supplied to the various locations in the coolant heater will be described more fully as the description proceeds.

In terms of the mechanism utilized to supply air to the coolant heater, it should be understood that the compressor-blower unit 88 is generally made up of an electrical motor shown schematically at 98 in FIG. 2. The right hand side of the motor as seen in FIG. 2 drives a fan (not shown in FIG. 2) within housing 100. This fan, in turn, supplies secondary and tertiary air to the coolant heater via conduits 92 and 94. A further description of the fan will be made below in connection with a discussion of FIG. 8.

The left hand side of motor 98 drives a small compressor shown schematically at 102 in FIG. 2. The compressor itself forms no part of this invention and a further description of the compressor apparatus is not believed to be necessary. It should be understood, however, that the compressor is of the type in which the rotating motor shaft drives an eccentric cam which, in turn, pulses a diaphragm in order to supply air under slight pressure to the conduit 90. In the preferred embodiment of this invention the air pressure within the conduit 90 is approximately 3 psi.

Mounted immediately below the compressor-blower unit is the electrical relay 104. This relay receives a source of energy from the vehicle battery by means of an electrical conductor shown schematically as 106. Suitable leads shown schematically as 108, 110 extend from the relay and are adapted to provide an interconnection of the relay into the control system of the coolant heater. For ease of description, leads 108, 110 are not shown interconnected into the electrical system of the apparatus. The complete function of the relay 104 will be described in connection with the discussion relating to the electrical schematic diagrams of FIGS. 9 and 10.

Finally, it will be noted in FIG. 2 that an exhaust conduit 112 extends from the bottom wall of the coolant heater. The purpose of the exhaust conduit is to carry away from the coolant heater the products of combustion generated by ignition of the fuel-air mixture within the coolant heater. Suitable exhaust apparatus (not shown in FIG. 2) is interconnected to the conduit 112 in order that the exhaust products of the combustion heater may be discharged to atmosphere.

To recap the general structure of the apparatus of this invention as shown in FIG. 2 (in a schematic form), the coolant heater 20 is mounted so as to receive diesel fuel from the vehicle fuel tank through fuel bowl 78 and the solenoid operated shutoff valve 74 mounted adjacent the nozzle 26. Primary, secondary and tertiary air is supplied to the coolant heater by means of the compressor-blower unit 88. High tension electrical energy is supplied to the spark plug 82 by means of the ignition appartus 84. A flow of engine coolant fluid is maintained through the coolant heater by means of the coolant pump 34 which receives coolant from the engine and, in turn, supplies pumping pressure to cause such fluid to flow through the coolant heater and back to the engine.

Attention will now be directed to FIG. 3 wherein an elevational cross-sectional view of the coolant heater is shown in enlarged detail.

As will be apparent from a study of FIG. 3, the coolant heater is generally made up of the burner head 28, generally cylindrical side walls 114, 116 which serve to define a combustion chamber 118 and a bottom plate 120. A water heating jacket 122 surrounds the combustion chamber and provides the means by which cooling fluid passing through the heater is caused to absorb thermal energy.

Burner Head

Attention will first be directed to a description of the burner head indicated generally at 28 in FIG. 3. The principal support member of the burner head is the body 124 which is generally cylindrical. A mounting plate 126 is secured to body 124 and extends generally radially therefrom. Disposed within body 124 is air spin cup 128. Cup 128 is generally frusto-conical in shape having its divergent end portion secured to the bottom-most portion of the inner wall of body 124 as is shown in FIG. 3. The uppermost portion 130 of the cup turns generally radially inwardly and provides a supporting shelf or shoulder for flange 132 of the nozzle holder 134. The nozzle holder is secured to the spin cup by means of fasteners 136 which extend through flange 132 and into the shoulder portion 130 of the spin cup 128. A spacing means 137 is provided to allow air passage between cup 128 and shoulder 132 of holder 134. Secondary air passes between flange 132 and shoulder 130 (in the gap defined by spacer 137 which is interrupted circumferentially) and past the edge of shoulder 130 into space 149. In the preferred embodiment three fasteners 136 are utilized to retain the nozzle holder in place as will be seen from an inspection of FIG. 4.

Nozzle 26 is retained within holder 134 by means of a pair of set screws 138. The mounting arrangement for the nozzle 26 as is shown in FIG. 3 makes it convenient to obtain ready access to the nozzle in the event that it should require cleaning or servicing of any type.

It will be noted from an inspection of FIG. 3 that nozzle 26 generally is defined by an inlet end 140 and a discharge end 142. The relationship of the nozzle to the spin cup 128 is such that the discharge end of the nozzle (i.e., end 142) is disposed within space 144 lying within or defined by the frusto-conical wall of the spin cup 128.

Figure 5:
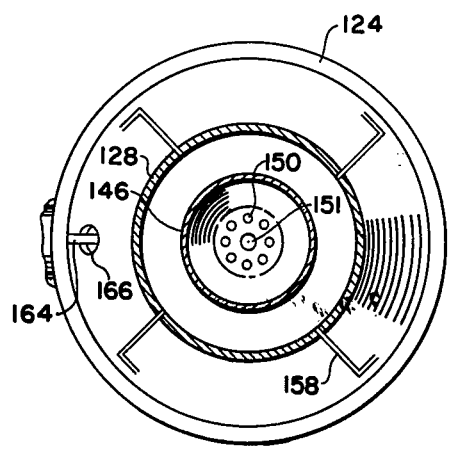
FIG. 5 is a cross-sectional elevational view taken along the line 5—5 of FIG. 3.

Disposed within the air spin cup 128 is an air spread cup 146. Spread cup 146 is generally defined by a frusto-conical side wall and a bottom wall 148 having a number of apertures therein. A clearer view of the apertures in the bottom wall may be seen in FIG. 5. The outer circumference of apertures are identified as apertures 150 in FIG. 5. The function of apertures 150 is to permit the flow of air from the space 149 to cool the discharge nozzle. This prevents carbon formation on the nozzle tip. A central aperture 151 permits the flow of the fuel-primary air mixture discharged from the nozzle.

Immediately adjacent the frusto-conical wall of the air spin cup 128 there is defined a secondary air supply chamber 152. Air chamber 152 is defined by the air spin cup 128, body 124 and cover 154. An air supply tube 156 defines a conduit for the supply of secondary air into chamber 152. The relationship of tube 156 to the body 124 may be seen more clearly in FIG. 4. In order to better understand the operation of the burner head cover 154 has been removed from FIG. 4.

Referring once again to FIG. 4 it will be noted that a plurality of aperture means or slots 158 are defined in the frusto-conical wall of air spin cup 128. It will be appreciated from a study of FIG. 4 that secondary combustion air introduced into space 152 by means of air supply tube 156 will be caused to flow in a generally clockwise pattern within the space or chamber when viewed from above. This is due to the fact that the axis of the air supply tube 156 is generally transverse to the axis of the frusto-conical wall of the air spin cup 128 and the fact that the introduction of secondary air into space 152 is essentially tangential to the side wall defined by body 124.

Thus it should be understood that secondary air introduced into the space 152 of FIG. 4 by the air supply tube 156 will generally flow in a clockwise pattern when viewed from above. Since slots 158 lie in the path of clockwise rotation of secondary air there is accomplished a controlled flow of air through slots 158 and into space 144. Thus, there is a passage of secondary air in a general rotating pattern about nozzle 26. Such secondary air is caused to mix with the fuel-primary air mixture being discharged by the nozzle at the discharge end 142.

There is also a flow of secondary air through the interrupted spacer 137 and into chamber 149 in order to cool the nozzle as previously has been noted.

Although in the preferred embodiment of the invention as shown in FIG. 4 the aperture means or slots 158 are generally rectangular in nature, it should be understood that within the spirit of this invention, other aperture means may be employed of varying size and shape.

Extending from body 124 (FIG. 3) is an igniter boss 160. In turn, electrical igniter means 162 is supported by the boss. In the preferred embodiment as shown in FIG. 3 igniter means 162 is defined by a spark plug. As will be evident from FIG. 3 spark plug 162 is provided with an elongated electrode 164 which extends through an aperture 166 defined in the air spin cup 128 and into the space 144 defined by the air spin cup.

The function of spark plug 162 is, of course, to provide a spark within the combustion chamber 118 in order to ignite the fuel and air in such combustion chamber. For ease of description the high tension or high voltage wire from the ignition pack identified schematically at 84 in FIG. 2 has been omitted from FIG. 3.

Attention will now be directed to FIG. 6 wherein there is shown an elevational cross-sectional view of the nozzle itself. Nozzle body 170 is provided with suitable connecting threads 172, 174 for the attachment of fuel and primary air lines. Threads 172 are adapted to receive a fitting element for attachment of a fuel line whereas threads 174 are adapted to receive a fitting element for attachment of the primary air line. The fuel line (not shown in FIG. 6 for ease of description) extends from the solenoid operated shutoff valve shown schematically at 74 in FIG. 2. Alternately, the shutoff valve may be connected directly to the nozzle body 170.

The primary air line which is adapted to be interconnected into threads 174 is shown schematically as conduit 90 in FIG. 2. Again for ease of description, the primary air conduit has been omitted from FIG. 6.

After entering nozzle body 170 the diesel fuel enters passageway 176 generally defined on the axis of the nozzle. Subsequently, the fuel is conducted into passage 178 which is defined in insert 180. A sealing O-ring 182 is interposed between insert 180 and nozzle body 170 in order to prevent the leakage of fuel into the air chamber 184. Primary air under pressure is introduced into air chamber via passageway 186. Primary air is then caused to be passed through flutes 188 and into the receiving chamber 190. From receiving chamber 190 the primary air is caused to pass through angularly disposed slots 192 defined in tip 194 where, subsequently, the primary air and fuel mix causing the fuel to be atomized. A mixture of fuel and primary air is then caused to be discharged as an atomized spray or mist.

As will be noted in FIG. 6, tip 194 is held within insert 180 by means of a retainer 196. A suitable threaded connection is provided between retainer 196 and body 170 at threads 198. In addition, suitable threads 200 are provided for the purpose of enabling insert 180 to be received within retainer 196 in threaded engagement.

Briefly summarizing, therefore, nozzle 26 receives fuel and primary air. The fuel is caused to be atomized within the nozzle by the primary air. The fuel and air are then discharged as a finely divided spray or mist into the combustion chamber as is shown schematically in both FIGS. 3 and 6.

As the fuel-primary air mixture is discharged into space 144 of the burner head there occurs an intermixing of these fluids with secondary air which is caused to converge about the discharge end 142 of the nozzle in a generally swirling or rotating pattern. This pattern of flow in the space defined by the air spin cup 128 is accomplished by reason of the orientation of the slots 158 defined in the air spin cup and the orientation of the air supply tube 156 relative to body 124.

It should be noted that the air spread cup 146 functions within the air spin cup 128 in order to define a generally annular path 200 for the flow of secondary air within the air spin cup. The air spread cup 146 thus serves to enhance the flow of secondary air as it enters the combustion chamber itself. The cup also defines a spacer 149 for the passage of cooling air about the nozzle.

As has previously been noted in connection with the description of FIG. 2 secondary air to the burner head is provided by means of a motor driven blower unit within the housing shown schematically as 100 in FIG. 2. Attention will now be directed to FIG. 8 wherein the blower unit is shown in greater detail.

Motor 98 of FIG. 8 drives shaft 204 to which hub 206 is attached. A backing plate 208 is attached to the hub and provides support for a plurality of blades 210 which are attached to and mounted on the backing plate. A housing 100 surrounds the rotating blades and together with the plate 212 defines a chamber into which air is admitted by means of an aperture 214.

Secondary air is taken from the blower housing by means of the conduit 216. It should be understood that the conduit 92 shown schematically in FIG. 2 is adapted to be connected to the conduit 216 of FIG. 8 in order to provide for the flow of secondary air into the burner head. Although not shown in FIG. 8 there is a second conduit projecting from housing 100 similar to conduit 216 in order to provide for a flow of tertiary air from the blower to the air pipe 96 of the combustion heater. Conduit 94 shown schematically in FIG. 2 provides means for the passage of tertiary air from the blower to the air pipe 96.

Combustion Chamber

Attention will now be directed to FIG. 3 for a more complete description of the combustion chamber 118.

As has previously been noted cylindrical side walls 114, 116 generally define the side extremities of the combustion chamber 118. Side wall 144 will be referred to as the inner burner wall whereas side wall 116 will be referred to as the outer burner wall. As will be noted from FIG. 3 a plurality of apertures 220 are defined in the inner burner wall 114 in order to permit the flow of combustion products or exhaust gases into the annular space 222 defined between the walls 114, 116. Since apertures 220 are located generally near the bottom portion of the inner burner wall 114, the flow of exhaust gases in the space 222 is generally in an upward direction as is shown in FIG. 3.

Side walls 114, 116 are generally cylindrical in shape and are disposed generally concentric with the center line or axis of the coolant heater. Coincidentally, the axis of the nozzle 26 also lies on the center line or axis of the coolant heater.

Also disposed concentric to the axis of the center line of the heater are cylindrical walls 224, 226. Cylindrical wall 224 will be termed an inner boiler wall whereas cylindrical wall 226 will be termed an outer boiler wall. Walls 116, 224 together define an annular space 228. A plurality of apertures 230 are defined in the outer burner wall 116 in order to provide for a flow of exhaust gases into the annular space 228. Since apertures 230 are located near the upper part of the outer burner wall 116 the general flow of exhaust gases in space 228 is in a downward direction as is shown in FIG. 3. There is thus established a counterflow of gases in the annular spaces 222, 228.

The bottommost portions of side walls 114, 116 are welded to the bottom plate 120. The upper portion of side wall 114 is welded to the inner wall of burner head body 124 whereas the upper portion of side wall 116 is welded to the underside of mounting plate 232.

The inner boiler wall 224 and the outer boiler wall 226 together define an annular space 234 which is adapted to receive coolant fluid 236. The upper edges of cylindrical walls 224, 226 are welded to the underside of top cover plate 238. This plate, in turn, is caused to be secured to the mounting plates 126, 232 by means of a plurality of fasteners 240.

The bottommost edge of the cylindrical wall 224 is caused to be welded to bottom plate 242 which, in turn, is welded to the exhaust conduit 112. Similarly, the bottommost edge of the cylindrical wall 226 is caused to be welded to bottom plate 246 which, in turn, is welded to the exhaust conduit 112. The entire space defined between the cylindrical walls 224, 226 and the bottom plates 242, 246 is water tight and is adapted to receive a flow of coolant fluid therein.

A coupling spud 248 is welded to the lower outer surface of the outer boiler wall 226 in order to receive a suitable conduit providing for the flow of coolant fluid into the coolant heater. Similarly, a spud 250 is secured to the outer portion of wall 226 along the upper edge thereof in order to provide for the flow of coolant fluid out of the coolant heater. In the preferred embodiment, therefore, coolant fluid is caused to enter the heater near the lower extremities of the heater. The heated water is removed from the heater near the upper extremities thereof.

Obviously within the scope of this invention other coolant paths may be defined within the coolant heater in order to provide for the flow of fluid therethrough. For example, the coupling spud 248 could, if desired, be located in the bottom plate 246 in order to provide for the entry of cooling fluid through such bottom plate. Similarly, the coupling spud 250 could be defined in the top cover plate 238 to provide for the flow of coolant fluid through such cover plate if desired.

It will be appreciated that the coolant fluid is caused to be passed in heat exchange relationship to products of combustion as combustion gases pass through annular space 228. This flow, in turn, provides a source of thermal energy for the fluid within space 234.

As will be evident from the arrow directions shown in FIG. 3, the flow of exhaust gases generally proceeds through the apertures 220 of wall 114 and in an upward direction within the annular space 222. Thereafter, a counterflow is established as the exhaust gases flow through apertures 230 of wall 116 and into the space 228. Finally, the exhaust gases are caused to be conveyed into the lower passageway 252 and thereafter into the exhaust conduit 112.

In order to minimize heat loss from the heater of this invention the exterior cylindrical walls 226 may be lined with suitable insulating material such as fiberglass or the like. Such material may be disposed within space 254 shown adjacent the outer boiler wall 226. If desired a metal band 256 and one or more straps 258 may be used to retain insulation material and the band in place.

TERTIARY AIR

A description will now be made of the elements of the apparatus of this invention which provide for the introduction of tertiary air into the combustion chamber.

Figure 7:
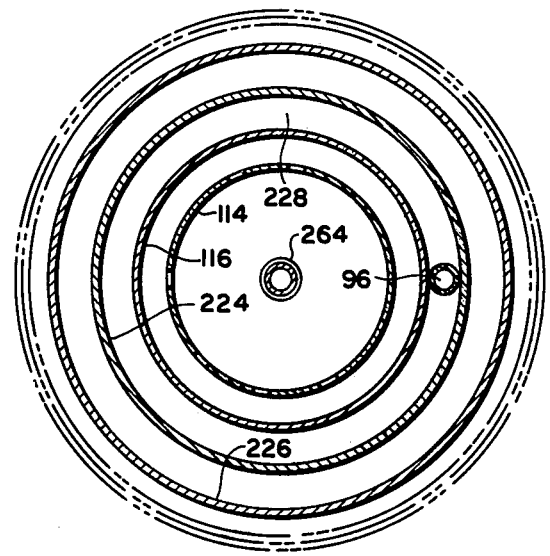
FIG. 7 is a cross-sectional elevational view taken along the line 7—7 of FIG. 3.

Disposed within a portion of annular space 228 is an air pipe 96. As has been noted in connection with a discussion of FIG. 2 tertiary air is supplied to the air pipe 96 by means of a suitable conduit (identified schematically as 94 in FIG. 2) extending from the blower unit. A coupling 260 (FIG. 3) is used to provide an interconnection of the tertiary air conduit extending from the blower unit and the air pipe 96. As will be evident from FIG. 3, air pipe 96 is approximately of the same diameter as the radial dimension of the annular space 228. A bend is provided at the lowermost portion of the pipe 96 in order to permit said pipe to enter space 252. An elbow 262 is provided to permit an extension 264 of the pipe to project into the combustion chamber 118. As will be noted in FIG. 3, the extension 264 is generally disposed on the axis or center line of the heater and projects through the bottom plate 120 at approximately the mid-portion thereof. A cross-sectional view of the air pipe 96 within space 228 is shown in FIG. 7.

A plurality of apertures 266 are defined in the extension 264 to provide for the entry of tertiary air into the combustion chamber. In addition, tertiary air is caused to flow through the open end 268 of the extension itself.

The flow of tertiary air into the combustion chamber is in the pattern indicated in FIG. 3 by the various arrow directions extending from the open end 268 and apertures 266.

Since the air pipe 96 is in contact with exhaust gases and products of combustion entering the annular space 228, it will be appreciated that tertiary air flowing within the air pipe 96 will be heated prior to its introduction into the combustion chamber. Thus the products of combustion generated within the heater for the purpose of providing thermal energy for coolant fluid passing through the heater are also used for purposes of preheating tertiary air prior to the introduction of such tertiary air into the combustion chamber. Such preheating enhances combustion.

One function of the preheated tertiary air is to provide for more complete burning of the fuel-air mixture placed within the combustion chamber by the burner head. At the same time the tertiary air serves to create an upward draft in the combustion chamber which serves to promote greater mixing and circulation of the fuel and air in the combustion chamber thus providing for more complete combustion of fuel.

It should be noted that diesel fuel is generally considered to be one of the more difficult fuels to burn. This is especially true if combustion takes place where high temperatures and high pressures are not normally present. Accordingly, the burning of diesel fuel at essentially atmospheric pressure is considered to be somewhat difficult in view of the fact that incomplete combustion is often achieved. As a result oily or sooty deposits soon collect.

It has been found, however, that the introduction of heated tertiary air into the combustion chamber in the manner shown in FIG. 3 produces an essentially residue free burning of diesel fuel in the combustion chamber.

It will be noted in FIG. 3 that the axis of the air pipe extension 264 is located on approximately the longitudinal axis of the heater itself. Thus, the axes of the extension 264, the nozzle 26 and the coolant heater are very nearly coincidental.

Similarly, it will be noted from FIG. 3 that the tertiary air is caused to be fed into the combustion chamber at approximately the mid-zone of the chamber, i.e., approximately midway between the discharge end of the nozzle and the bottom plate 120. This zone for the introduction of tertiary air is considered somewhat advantageous.

CONTROL SYSTEM

Attention will now be directed to FIGS. 9 and 10 wherein the electrical control system for the coolant heater of this invention will be described.

In FIG. 9 the "start" mode of the control system is shown. The term "start" mode is intended to convey the condition of the coolant heater at the time that the on-off switching means is first placed in the "on" position or the unit cycles "on" after a period of no heating.

As will be noted in FIG. 9 the essential elements of the control system of this invention include circuit interrupting means 272, on-off switching means 274, electrical timer means 276, thermocouple probe 278, flame switch 280, relay 282, relay 284 and over-heat thermostat 286.

Interconnected into the control system are the various elements of the coolant heater including the ignition coil 288, water pump 290, the solenoid operated fuel shutoff valve 292, fuel pump 294 and the compressor-blower motor 296. Elements 288, 290, 292, 294 and 296 are shown schematically in FIG. 9 and correspond to similar elements described in connection with FIG. 2. Ignition coil 288 shown schematically in FIG. 9 corresponds with the ignition pack or ignition apparatus 84 of FIG. 2. Water pump 290 of FIG. 9 corresponds with water pump 34 of FIG. 2. Solenoid operated fuel shutoff valve 292 of FIG. 9 corresponds with valve 74 of FIG. 2. Fuel pump 294 of FIG. 9 corresponds with fuel pump 24 as shown in FIG. 1. Finally, motor 296 of FIG. 9 corresponds with motor 98 shown schematically in FIG. 2.

Relay 282 as shown in FIG. 9 is a double pole, double throw relay. It is shown in FIG. 9 in the "start" mode.

As will be evident from FIG. 9, placing the on-off switching means 274 in the "on" position causes electrical power from the vehicle 12 volt DC system to be supplied to the coil 298 of relay 284. This causes the contacts 300, 300' of the normally open relay to close thereby causing electrical power to be supplied to motor 296 through the terminal "9". Motor 296 is thus energized and primary, secondary and tertiary air is supplied to the coolant heater.

Also it will be observed that in the "start" mode of FIG. 9, the fuel pump 294 and the solenoid operated fuel shutoff valve 292 are energized as electrical power is supplied to terminal "7" from terminal "6". Energizing of the fuel pump 294 causes diesel fuel to be supplied to the solenoid operated shutoff valve. Energizing of the solenoid valve causes the valve to open thereby permitting a flow of diesel fuel into the nozzle of the coolant heater. When not energized the valve is closed.

It will also be noted in FIG. 9 that the electrical control system provides for electrical power to be supplied to the ignition coil 288 and the electrical timer means 276. The iginition coil 288 is connected to terminal "8" and receives its power through the selector switch 302 which (as shown in FIG. 9) is in the "intermittent" position. In the "intermittent" position contacts 304 and 306 of the selector switch 302 are closed.

The electrical timer means 276 (which is energized in the "start" mode of the control system) is basically a resistance type of electrical apparatus which heats up when energized. If electrical energy is supplied to the electrical timer means 276 over a predetermined time interval this apparatus will cause the reset switch 308 to trip thereby interrupting all electrical power to the control system. As will be described more fully below, the function of the electrical timer means 276 is to interrupt electrical power to the control system in the event that ignition is not achieved in the combustion chamber of the heater.

To recap, the "start" mode of the electrical control system of this invention is shown in FIG. 9. With the on-off switching means in the "on" position, the compressor motor, fuel pump, solenoid operated shutoff valve, and ignition coil are energized causing air and fuel to be supplied to the coolant heater. In addition, high tension energy is supplied to the spark plug of the heater by the ignition coil thereby providing for ignition means within the combustion chamber. Finally, placing the on-off switching means in the "on" position starts a timed interval during which combustion must be proved in the combustion chamber. Otherwise upon reaching the end of the timed interval the electrical timer means 276 will cause the reset switch 308 of the circuit interrupting means 272 to trip thereby shutting down the heater.

Figure 10:
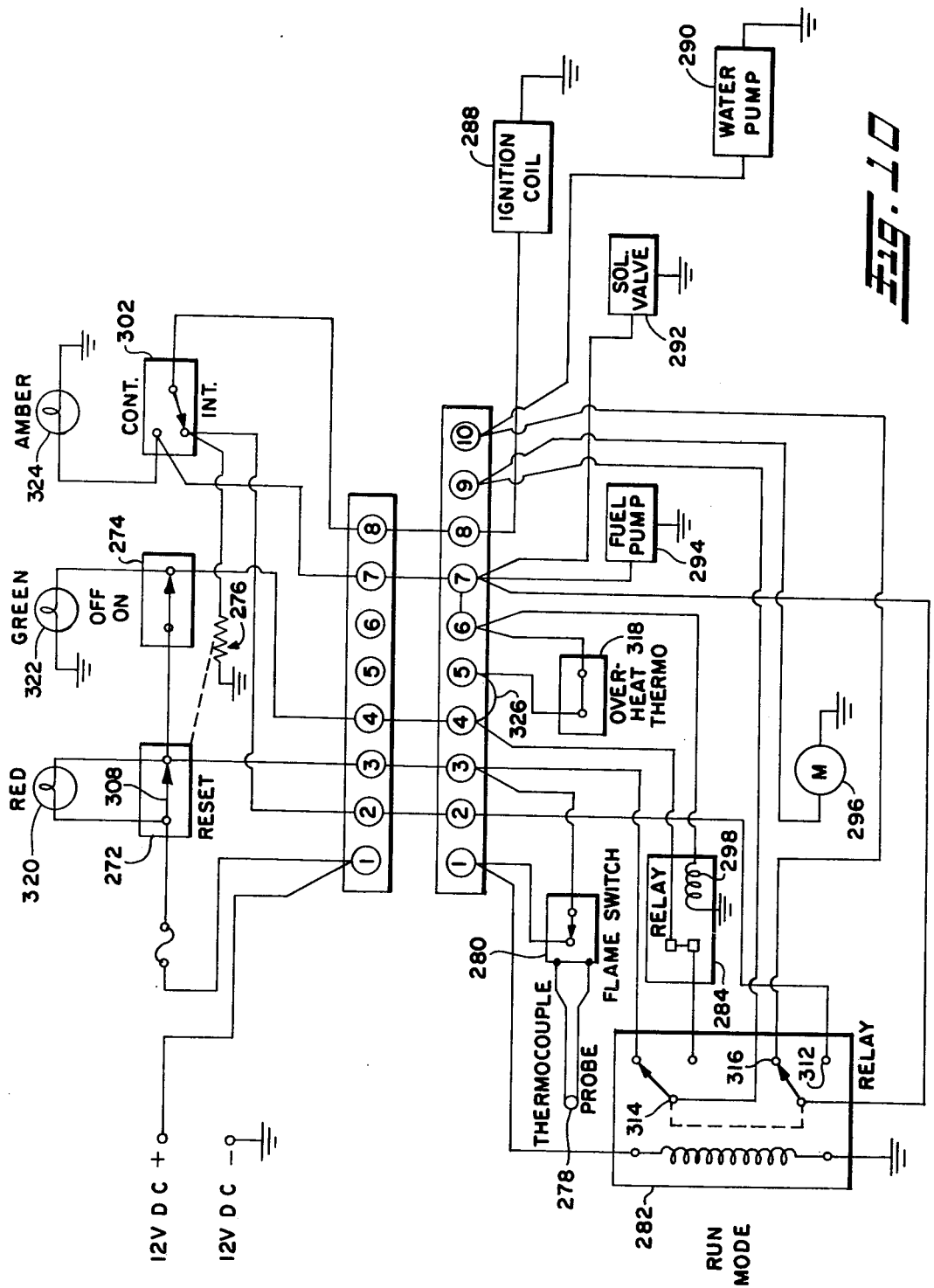
FIG. 10 is an electrical schematic diagram of the control system of this invention in the "run" mode.

Attention will now be directed to the electrical schematic diagram of FIG. 10 wherein the control system of this invention is shown in the "run" mode. The "run" mode is achieved in the control system of this invention after the existence of combustion within the combustion chamber of the heater has been proven.

A thermocouple probe shown schematically in FIG. 10 as element 278 is inserted in the combustion heater and is interconnected electrically to the flame switch 280. At such time as combustion is achieved in the combustion chamber of the heater the thermocouple probe serves to close the flame switch 280 as is shown in FIG. 10. Closing of the flame switch causes electrical energy to be supplied to coil 310 of relay 282 causing the relay to be switched from the position of FIG. 9 to that shown in FIG. 10. Once relay 282 has been switched to the position of FIG. 10, the control system is considered to be operating in the "run" mode.

It will be observed from FIG. 10 that in the "run" mode the fuel pump 294 and the solenoid operated shutoff valve 292 remain energized through the terminal "7". The ignition coil 288 and the electrical timer means 276 are de-energized, however, since electrical energy is no longer supplied to contact 312 of relay 282. So long as the electrical timer means 276 is de-energized prior to the preset timed interval for tripping the reset switch 308, the control system will make a smooth transition from the "start" mode to the "run" mode. As has been noted previously, however, the failure to verify the presence of flame in the combustion chamber of the heater prior to the time that the electrical timer means 276 has reached the end of its timed interval will cause the entire electrical system to shut down as the reset switch 308 will trip causing all electrical power to the control system to be interrupted.

The selector switch 302 of FIG. 10 remains in the same "intermittent" position as shown in FIG. 9. By "intermittent" is meant that electrical energy will be supplied to the ignition coil 288 only during the "start" mode of the heater. Once the existence of flame in the combustion heater has been proven and the relay 282 switches to the "run" mode, electrical energy is no longer supplied to the ignition coil 288 with the selector switch 302 in the position of FIG. 10. Further combustion in the heater is sustained through a spontaneous burning of fuel and air.

It will also be noted from FIG. 10 that in the "run" mode electrical power is supplied to the compressor-blower motor 296 through the terminal "9" which is supplied by the contact 314 of relay 282.

Finally, it will be noted that the water pump 290 of FIG. 10 is energized through the terminal "10" which receives electrical energy from contact 316 of relay 282.

To recap, the "run" mode of the electrical control system of this invention provides for power to be supplied to the compressor motor 296, the fuel pump 294, the solenoid operated shutoff valve 292 and the water pump 290. Power is not supplied to the ignition coil with the selector switch in the "intermittent" position and combustion in the heater itself is sustained spontaneously. Nor is power supplied to the electrical timer means 276 since the presence of flame in the combustion heater has been verified within the preset timed interval provided for in the design of the timer apparatus 276.

Operation of the coolant heater in the "run" mode as shown in FIG. 10 will continue until such time as the temperature of coolant fluid has reached a preset limit. When sufficient heat has been supplied to the coolant fluid in the vehicle system, the over-heat thermostat shown schematically at 318 in FIG. 10 will open. This will cause electrical energy to the fuel pump and the solenoid operated shutoff valve to be interrupted. Without fuel the combustion chamber will soon cool causing the flame switch 280 to open thereby causing the relay 282 to switch to the "start" mode as shown in FIG. 9. However, since relay 284 is no longer energized all electrical elements of the control system will be shut down including the compressor motor 296, fuel pump 294, solenoid operated shutoff valve 292, and water pump 290. The coolant heater will remain in a shut down status until the over-heat thermostat 286 closes at which time the entire cycle will be repeated starting with the relay 282 in the "start" mode.

In FIG. 11 there is shown a modification of the control system of this invention with respect to the manner of supplying electrical energy to the coolant pump. It will be observed in FIG. 11 that the pump 290 is connected to terminal "5" rather than terminal "10" as is shown in FIG. 10. When connected to terminal "10" the pump is energized only after relay 282 is switched to the "run" mode. In the configuration of FIG. 11, however, the pump is connected to terminal "5" and thus is energized along with the fuel pump 294 and the solenoid valve 292 when the unit is in the "start" mode and the on-off switching means is in the "on" position. Except for the modification in the connection of pump 290 to terminal "5" all other portions of FIG. 11 are identical to the electrical schematic diagram shown in FIG. 9.

Whether or not water pump 290 is connected to terminal "10" or terminal "5" is a matter of operator preference. When the combustion heater is used for standby operation, terminal "10" will be selected. When, however, the combustion heater is used for quick start heating only, water pump 290, as shown schematically in FIG. 11, will be connected to terminal "5".

INDICATOR LIGHTS

As will be observed in FIGS. 9 and 10, the control system of this invention is provided with a plurality of indicator lights. These lights function to indicate or display the existence of certain conditions in the system.

Red light 320 is normally off. In the event that the reset switch 308 should be tripped by the electrical timer means 276, light 320 will be turned on indicating the fact that power to the electrical control system has been interrupted due to the absence of flame in the combustion chamber.

Green light 322 will be normally on with the switch 274 in the "on" position. By turning the on-off switching means to the "off" position, the green light will be turned off.

The green light 322, therefore, indicates that the heater is in an operating mode and all circuits are operational although the heater may not be burning at the time.

The amber light 324 indicates the existence of burning in the combustion chamber. In the position of the selector switch 302 as shown in FIG. 9, the amber light will indicate the fact that fuel pump 294 and solenoid operated shutoff valve 292 have been energized. Under these conditions it may be presumed that combustion is being achieved since fuel is being pumped to the heater and the flame switch 280 and the electrical timer means 276 would shut the unit down if combustion were not present.

In the position of the selector switch 302 as shown in FIG. 12, however, a lighted amber bulb 324 will indicate the fact that electrical power is being supplied to the ignition coil as well as to the fuel pump and the solenoid operated shut-off valve.

IGNITION SELECTOR SWITCH

The selector switch 302 is shown in FIG. 12 in the "continuous" position. The word "continuous" is intended to convey the fact that a constant source of electrical energy is provided at the ignition coil through the terminal "8".

The selection of the position of switch 302 to either the "continuous" or "intermittent" position is an option available to the vehicle operator. Typically the operator will select the "intermittent" position (as shown in FIGS. 9 and 10) since it lessens the drain on the vehicle battery caused by power being supplied to the ignition coil.

In the electrical schematic diagrams as shown in FIGS. 9, 10 and 11 a jumper wire 326 is provided for the purpose of interconnecting terminals "4" and "5". In FIG. 13 there is shown a modification of the electrical control of FIGS. 9 and 10 in that the jumper wire 326 has been removed and a demand thermostat 328 has been inserted between terminals "4" and "5". Demand thermostat 328 may be installed at the option of the operator and may be used for purposes of cycling the heating of cooling fluid through a desired range of temperatures.

It will be appreciated from a study of FIGS. 9 and 10 that all of the electrical power necessary to operate the control system of this invention is taken from a 12 volt battery ordinarily found in most vehicles. All of the electrical motors which drive such apparatus as the fuel pump, the compressor-blower, and the water pump are 12 volt DC motors which are energized by the vehicle battery. Similarly, the ignition pack is a 12 volt apparatus which receives its power directly from the vehicle battery.

The control system of this invention, therefore, requires no external source of electrical power. It has been found that the current drain on the vehicle battery when operating the system of this invention for periods of up to eight hours is relatively low. No appreciable loss in cranking power will be encountered with the vehicle battery with the heater system of this invention in use for a period of up to eight hours. This invention makes it possible for a vehicle operator to maintain the engine block of his vehicle in a heated condition of, for example, 180 degrees F. for a period of up to eight hours without encountering any significant loss in the ability of the vehicle battery to restart the engine at the end of the eight hour period.

As has been indicated in connection with the discussion of FIG. 1, the coolant heater of this invention may provide a source of heated coolant fluid at the heater core in the vehicle passenger compartment. Typically, heat will be required in the vehicle when the operator elects to sleep in the vehicle with the engine turned off.

However, occasions may arise with the vehicle in service that will require additional heat to be provided by the coolant heater. For example, in long downhill runs in cold climates a tractor driver ordinarily experiences great difficulty in obtaining heat through the vehicle heater core due to the fact that the vehicle coolant temperature drops. The coolant heater of this invention may be used to alleviate this problem as it may be maintained in a standby condition ready to provide auxiliary heat for the coolant fluid in the vehicle system in the event that the engine itself is not in a condition to provide sufficient heat for maintaining the comfort of the vehicle operator. Thus, in a long downhill run in cold climates mentioned above the coolant heater of this invention will sense the need for auxiliary heat to be supplied to the coolant fluid of the vehicle. The unit may be expected to turn on automatically and provide additional heat unitl a suitable operating temperature level of the coolant has been achieved. Cycling of the coolant heater in order to maintain a preset coolant fluid temperature level can be expected to be maintained over a period of time until the engine is capable of providing sufficient thermal energy for the coolant fluid in order to satisfy all heating requirements.

What is claimed is:

1. A control system for a vehicle coolant fluid heater including accessories therefor, said heater including a combustion chamber, a fuel-primary air nozzle for admitting a fuel-primary air mixture into said combustion chamber, spark ignition means, means for admitting secondary and tertiary air into said combustion chamber, and means to circulate coolant fluid through said heater, said accessories including an ignition apparatus to energize the heater spark ignition means, a compressor-blower to supply primary, secondary and tertiary air to said heater, a fuel pump, a coolant fluid pump and a fuel shutoff solenoid valve; said control system comprising:
   (a) a source of DC power;
   (b) on-off switching means;
   (c) circuit interrupting means;
   (d) a two-position relay having a start mode and a run mode;
   (e) said ignition apparatus, said fuel pump, said solenoid shutoff valve and said compressor-blower being activated upon the closing of said switching means to an "on" position and with said relay in the start mode;
   (f) electrical timer means energized by said relay in the start mode, said timer means functioning to trip said circuit interrupting means after a predetermined timed interval if ignition in said combustion chamber has not been proven;
   (g) a flame switch responsive to flame in said combustion chamber, the closing of said flame switch after the establishment of flame in said combustion chamber acting to switch said relay from the start mode to the run mode thereby deactivating said electrical timer means;
   (h) said ignition apparatus, said compressor-blower, said fuel pump and said fuel shutoff solenoid valve being activated by said relay in the run position and with said switching means in an "on" position;
   (i) a high temperature limit thermostat disposed in said coolant fluid and adapted to interrupt the electrical circuit to said fuel pump and said solenoid shutoff valve, the opening of said thermostat upon achieving a preset temperature in said coolant fluid serving to interrupt the flow of fuel to said heater.

2. The invention of claim 1 in which said relay in the run mode activates said water pump.

3. The invention of claim 1 in which the closing of said on-off switching means to an "on" position activates said water pump.

4. The invention of claim 1 in which a demand thermostat is disposed in said coolant fluid which is adapted to complete the electrical circuit between said power source and said fuel pump and said solenoid valve.

5. The invention of claim 1 in which said ignition apparatus is activated by said relay in the start mode.

6. The invention of claim 1 in which said ignition apparatus is activated by said on-off switching means in the "on" position.

7. In a vehicle powered by a liquid cooled diesel engine and having a diesel fuel tank and a battery powered electrical system; a coolant heater system comprising:
   (a) a coolant combustion heater which includes a fuel-primary air injection nozzle supported by a burner head, means providing for the introduction of secondary and tertiary air into said combustion chamber, ignition means to ignite fuel and air in said combustion chamber, and means to pass coolant fluid in heat exchange relationship to the products of combustion;
   (b) a fuel pump driven by a motor energized by the vehicle electrical system;
   (c) means to convey diesel fuel from the vehicle tank to an electrical shutoff valve energized by the vehicle electrical system;
   (d) means to convey diesel fuel from said shutoff valve to said fuel-primary air nozzle of said heater;
   (e) a compressor-blower driven by a motor energized by the electrical system of said vehicle;
   (f) means to convey primary, secondary and tertiary air to said heater;
   (g) a coolant circulation pump driven by a motor powered by the electrical system of said vehicle;
   (h) means to circulate coolant from said heater to the vehicle engine coolant system;
   (i) electrical ignition apparatus powered by the electrical system of said vehicle;
   (j) said ignition means of said combustion heater being energized by said ignition apparatus;
   (k) control means having a start mode and a run mode, said control means in said start mode serving to energize said fuel pump, said ignition apparatus, and said compressor blower and an electrical timer means;
   (l) switching means responsive to flame in said combustion chamber, said switching means serving to switch said control means from the start mode to the run mode and to deactivate said electrical timer means when flame is not detected;
   (m) said electrical timer serving to interrupt the electrical circuit of said control means in the event that flame is not achieved in said combustion heater in a predetermined time.

* * * * *